M. SCHUYLER.
GEARING MECHANISM.
APPLICATION FILED OCT. 29, 1920.
1,408,407.
Patented Feb. 28, 1922.
2 SHEETS—SHEET 2.
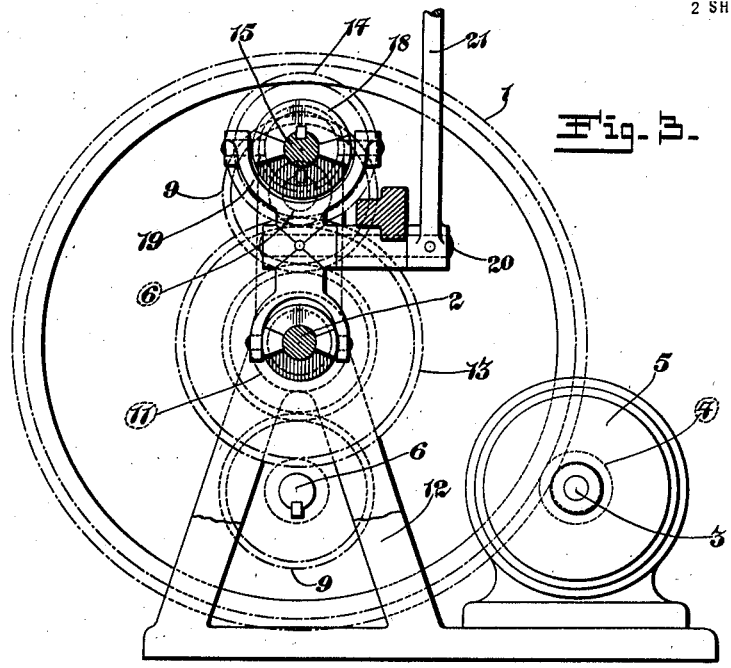
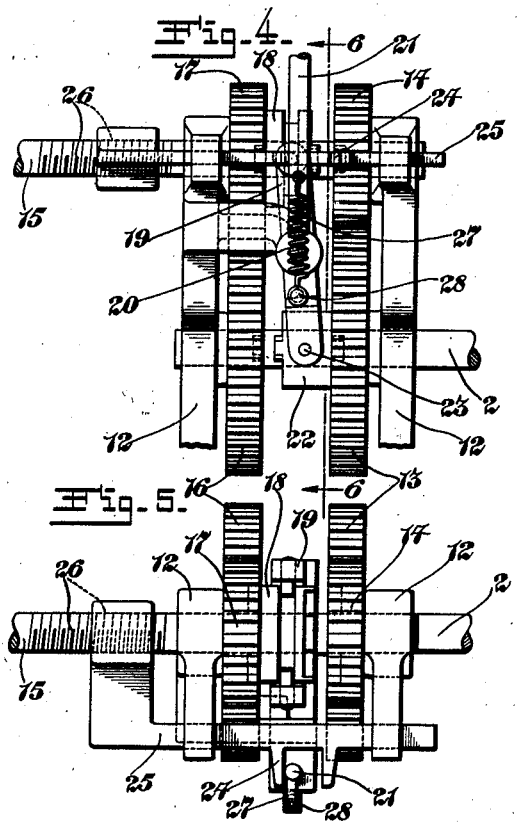
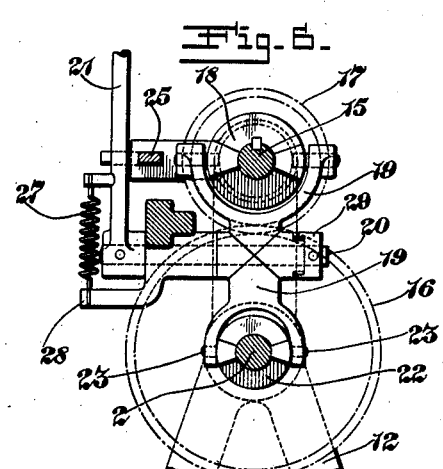
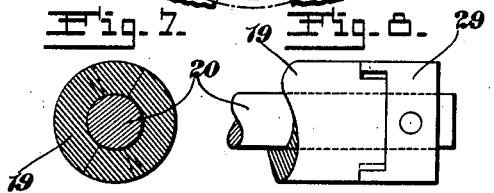
Inventor.
Montgomery Schuyler,
by Rippey Kingsland,
His Attorneys.

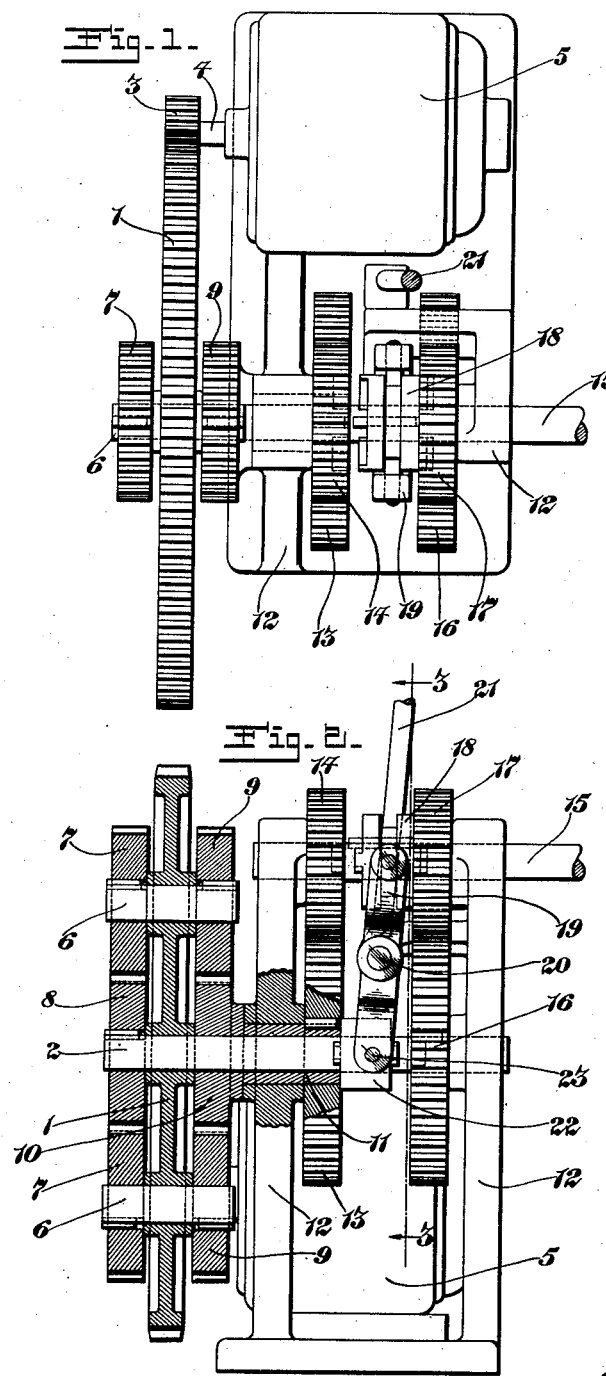

UNITED STATES PATENT OFFICE.

MONTGOMERY SCHUYLER, OF ST. LOUIS, MISSOURI.

GEARING MECHANISM.

1,408,407. Specification of Letters Patent. Patented Feb. 28, 1922.

Application filed October 29, 1920. Serial No. 420,397.

*To all whom it may concern:*

Be it known that I, MONTGOMERY SCHUYLER, a citizen of the United States, residing at the city of St. Louis and State of Missouri, have invented a new and useful Gearing Mechanism, of which the following is a specification.

This invention relates to gearing.

An object of the invention is to provide an improved gearing mechanism for operating a driven mechanism or part in a novel and more efficient manner than is possible by use of the gearing mechanisms which do not possess the advantages of the present invention.

Another object of the invention is to provide an improved gearing mechanism of novel construction and arrangement for operating a driven part or shaft alternately in opposite directions.

Another object of the invention is to provide a novel and improved planetary gearing mechanism for use as a driving mechanism between a prime mover and the mechanism to be operated.

Another object of the invention is to provide an improved and novel planetary gearing and means for utilizing the power of the gearing to operate a driven part or shaft alternately in opposite directions. This may be accomplished by the provision of manually operable mechanism for controlling the direction of operation of said shaft, or by provision of automatic mechanism for that purpose.

Another object of the invention is to provide a method of disconnecting the driving gearing from the driven shaft as an incident to the operation of the mechanism by which the direction of rotation of the driven shaft is reversed.

Various other objects of the invention and numerous advantages thereof will appear from the following description in which reference is made to the drawing, and in which—

Fig. 1 is a plan view of one form of the invention.

Fig. 2 is a view with parts shown in section and parts in elevation.

Fig. 3 is a view showing some of the parts diagrammatically and other parts in section, and may be considered as taken on the line 3—3 of Fig. 2.

Figs. 1 to 3 show the invention equipped with a manually operable device for controlling the direction of operation of the driven shaft or mechanism.

Fig. 4 is a side elevation showing the invention equipped with an automatic mechanism for controlling the direction of operation of the driven shaft or mechanism.

Fig. 5 is a plan view of the mechanism shown in Fig. 4.

Fig. 6 is a combined sectional and diagrammatic view and may be considered as taken on the line 6—6 of Fig. 4.

Figs. 7 and 8 are views showing details of a part of the mechanism controlling the direction of operation of the driven part.

As shown, the invention comprises a wheel 1 supported for rotation on a shaft 2 and arranged to be driven from a prime mover. In the specific arrangement illustrated the wheel 1 is a gear wheel driven from a gear 3 which is on the shaft 4 of the motor 5. Obviously, any appropriate means for operating the wheel 1 may be used and the form of the wheel may be varied as desired.

The wheel 1 supports a pair of short shafts 6, said shafts being preferably diametrically opposite from each other. The shafts 6 are parallel with each other and with the shaft 2. The outer end of each of the shafts 6 has a gear 7 attached thereto. Both of the gears 7 mesh with a gear 8 which is rigid with the shaft 2 upon which the wheel 1 is supported for rotation.

The inner end of each of the shafts 6 has a gear 9 attached thereto. Because of the fact that the gears 7 and 9 are attached to the same shafts, in the manner clearly shown in Fig. 2, it is clear that said pairs of gears must operate together, or in unison. The gears 9 mesh with the gear 10 which is supported for rotation upon and relative to the shaft 2.

As shown, the gears 9 and 10 are of uniform diameter and are provided with an equal number of teeth; whereas, the gear 7 is of less diameter than the gear 9 and also of less diameter than the gear 8, and is provided with a smaller number of teeth than the gear 8. For instance, the gear 7 may be formed with thirty-seven teeth, and the gear 8 may be formed with thirty-eight teeth, although, of course, the proportions may be altered and the same general result of operation obtained.

In the form shown, the gear 10 is formed with a relatively long hub or sleeve 11 at one side thereof, the same being journaled for rotation in a support 12. A gear 13 is made rigid with the hub 11, so that the gears 10 and 13 must rotate together and in the same direction. As shown, the gear 13 is supported on the opposite side of the support 12 from the gear 10, though it is possible to apply my invention to a construction in which gears 10 and 13 are not separated by a support such as 12.

The gear 13 is in mesh with the gear 14 supported loosely on a shaft 15 and equipped with mechanism hereinafter described for clutching the gear 14 to the shaft 15 when it is desired to drive the shaft 15 from the gear 14. This train of gearing is operable to rotate the shaft 15 in one direction. It will be understood that the gearing connections just described may be replaced by other forms of power transmission without departing from the invention. As stated among the objects of the invention, I provide means for operating the shaft 15 in the opposite direction as desired.

The shaft 2 rigidly supports a gear 16 meshing with a gear 17, which is loosely supported on the shaft 15. As shown, the gears 16 and 13 are of the same diameter, and have the same number of teeth. Likewise, the gears 14 and 17 are of the same diameter and have the same number of teeth. I do not, however, limit my claims to such proportioning, nor to any particular method of utilizing the opposite rotations of the gears 8 and 10.

By proper control of the gearing entraining the system of planetary gears with the shaft 15, said shaft may be operated in either direction as desired. Further, the direction of operation of said shaft 15 may be changed automatically and as an incident to the operation of the planetary gearing; or the device may be equipped with means to permit continuous operation of the shaft 15 in one direction and without change, if desired. In this last case, the mechanism hereinafter to be described, may be used as a clutch to engage the planetary gearing with the driven shaft 15. In the form of the invention shown in Figs. 1 and 3 manually operable means is provided for controlling the gearing which operates the shaft 15. By manual operation of said means, the direction of operation of the shaft 15 may be changed whenever desired. But, if the means controlling the direction of operation of the shaft 15 be left alone, the shaft will be driven continuously in one direction.

It is obvious from the construction of the planetary gearing that if the gear 13 is held stationary when the gear 1 is being driven by the prime mover, or motor 5, the gear 16 will be forced to rotate in, say, a clockwise direction when viewed as in Fig. 3. The rotation of the gear 16 will, in that case, drive the shaft 15 in a counter-clockwise direction, if the gear 17 is clutched to the shaft 15. Again, if the gear 16 is held stationary when the gear 1 is being driven as above, the gear 13 will be forced to rotate in a counter-clockwise direction when viewed as in Fig. 3. The rotation of the gear 13 will, in that case, drive the shaft 15 in a clockwise direction, if the gear 14 is clutched to the shaft 15. However, if neither the gear 14 nor the gear 17 is clutched to the shaft 15 the shaft 15 will not rotate, but will remain stationary.

The mechanism for controlling the direction of rotation of the shaft 15 includes means for clutching either of the gears 14 or 17 to the shaft 15, and at the same time preventing rotation of the gearing which is entrained directly with that one of the gears 14 or 17 which is left loose on the shaft 15, as the case may be. Specifically, if the gear 14 be clutched to the shaft 15 the gear 16 will be held from rotation; and, if the gear 17 be clutched to the shaft 15 the gear 13 will be held from rotation. As shown, the mechanism for clutching the gears 14 and 17 to the shaft 15 comprises a clutch member 18 keyed to and rotating with the shaft 15 and movable into and out of clutching engagement with the gears 14 and 17, respectively. Likewise, the mechanism for preventing the rotation of the gears 13 and 16 comprises a clutch member 22 which is not keyed to the shaft 2, but the shaft 2 rotates within and relative to the said clutch member 22. The clutch member 22 is held from rotation, as hereinafter described, and is movable along the shaft 2 into and out of clutching engagement with the gears 13 and 16, respectively.

In the position shown in Fig. 2, the clutch 18 is in engagement with the gear 17, clutching said gear 17 to the shaft 15. Likewise, the clutch 22 is in engagement with the gear 13, preventing the rotation of said gear 13. When the clutches 18 and 22 are in these positions, the gear 16 will revolve and, being in mesh with the gear 17, will drive the shaft 15 in, say, a counter-clockwise direction. If, however, either the clutch 18 or the clutch 22 is not in engagement with the gears 14 or 17, or the gears 13 or 16, respectively, the shaft 15 will not be driven in either direction even though the planetary gearing is being rotated by the prime mover 5. If, however, the clutch 18 be moved into engagement with the gear 14, and at the same time the clutch 22 is moved into engagement with the gear 16, the direction of rotation of the shaft 15 will, in that case, be in a clockwise direction.

For accomplishing the simultaneous movement in opposite directions of the clutches 18 and 22, I have provided a double lever 19 rigidly attached to a shaft 20, said shaft 20 being operated by a lever 21. Both ends of the lever 19 are, in the construction shown, bifurcated to embrace the clutches 18 and 22 in such a manner as to shift the clutch 18 along the shaft 15 in one direction while said clutch 18 is revolving, and to shift the clutch 22 along the shaft 2 in the opposite direction while preventing said clutch 22 from revolving, by means of a connection 23. Obviously, if the lever 19 moves the clutch 18 out of engagement with the gear 17, but not into engagement with the gear 14, the shaft 15 will not be driven in either direction. Likewise, if the lever 19 moves the clutch 22 out of engagement with the gear 13, but not into engagement with the gear 16, the shaft 15 will not be driven in either direction. But if the lever 19 moves the clutch 18 into engagement with either the gear 14 or the gear 17, at the same time engaging the clutch 22 with the gear 16 or the gear 13 respectively, the shaft 15 will be driven by the planetary gearing, the direction of rotation of said shaft 15, in either case, depending upon the direction of rotation of the prime mover 5 and the chosen ratio of the planetary gearing mechanism.

From the above description it is clearly seen that the lever 19 may be made in two parts, either one of which may be moved independently of the other. Furthermore, it is impossible to harm the mechanism even though the clutches 18 and 22 were both moved in the same direction, and engaged with, say, the gears 17 and 16; for, while in that case, the gear, 13 say, might be revolving, it would be in mesh with the gear 14 which is loose upon the shaft 15.

The gearing shown in Figs. 4 to 8 inclusive differs from the gearing above described only in that in the case of the gearing shown in Figs. 4 to 8, automatic means is provided to shift the clutches to change the direction of operation of the shaft or part 15 automatically and as an incident to the operation of the gearing. Obviously, such automatic mechanism may take different forms and only one such form is shown.

In the form shown the shift lever 21 is between a pair of arms 24 on a support 25. The support 25 is reciprocated by threaded connection 26 with the shaft 15. When the shaft 15 is turning in one direction, the support 25 is moved longitudinally. At the proper time one of the arms 24 engages and shifts the lever 21 from one position to another, thereby shifting the clutch members 18 and 22 as required to cause the gearing to rotate the shaft 15 in another direction. The change of direction of rotation of the shaft 15 changes the direction of movement of the member 25, so that after said member 25 moves the proper distance one of the arms 24 thereon again engages the lever 21 and shifts the clutches to change the direction of rotation of the shaft 15. These operations are continued while the gearing is operating.

To complete the throw of the clutch shifting mechanism when it is tripped by operation of the member 25, as above described, I have provided a spring 27 connecting the lever 21 with the stationary part 28 so that when said lever 21 passes beyond vertical position in either direction the spring 27 will complete the final movement of said lever.

For the allowance of a proper relative movement or lost motion as between the shaft 20 and the lever 19 resort may be had to a device such as that shown in Figs. 7 and 8. As shown, a recessed member 29 is attached to the shaft 20. The recesses in the member 29 receive projections on the lever 19 which are somewhat narrower than the recesses in the member 29 receiving the same. This leaves slight relative movement between said parts.

From the foregoing it is apparent that my invention completely and satisfactorily performs its functions. I do not restrict myself to unessential features, but what I claim and desire to secure by Letters Patent, is:—

1. In a gearing, a shaft, a pair of independently rotatable central gears on said shaft, planetary gears for operating said first-named gears, an additional shaft, gears on said additional shaft for rotating the same, a shiftable device for selectively holding either of said central gears against rotation, and causing the planetary gears to rotate the other central gear, means under control of said device for controlling the rotation of said additional shaft by said second-named gears, means for shifting said device to position to hold either of the central gears against operation, and power connections driven by the revolving gear.

2. In a gearing, the combination with a driven shaft, of driving mechanism therefor including a pair of parallel driving trains of gearing, a pair of central gears, a planetary gear support, a number of pairs of planetary gears carried by said support and meshing with the central gears, the planetary gears of each pair being rigidly united, connections for operating one of the parallel trains of gears from each central gear, and means for selectively cooperating said parallel trains of gears with said connections, whereby the driven shaft may be rotated in opposite directions from a continuous rotation of the planetary gear support.

3. In a gearing, the combination with a number of pairs of planetary gears having the gears of each pair rigidly united, and a pair of central gears in mesh with the planetary gears, of a clutch device adapted to control the rotation of both of said rotatable central gears whereby when one is held against rotation the other will be revolved in one direction and when the other is held against rotation the one will be revolved in the opposite direction, and means for shifting said clutch device to hold alternate ones of said central gears against rotation.

4. In a gearing, the combination with a driven rotatable element, of duplicate power transmission mechanism therefor, separate gears for actuating said transmission mechanisms, a planetary gear support, pairs of planetary gears in said support meshing with said first-named gears and having the gears of each pair rigid with each other, and a clutch device operable effectively to hold alternate ones of said first-named gears against rotation and couple the transmission mechanism actuated by the other of said first-named gears to the driven element whereby said element may be alternately rotated.

5. In a gearing, the combination with a driven rotatable element, of duplicate power transmission mechanisms therefor, separate gears for actuating said transmission mechanisms, a planetary gear support, pairs of planetary gears in said support meshing with said first-named gears and having the gears of each pair rigid with each other, a clutch device operable effectively to hold alternate ones of said first-named gears against rotation and couple the transmission mechanism actuated by the other of said first-named gears to the driven element, whereby said element may be alternately rotated, and automatic means for shifting said clutch device.

6. In a gearing, duplicate trains of transmission mechanisms, a planetary gear support, pairs of planetary gears carried by said support and having the gears of each pair rigid with each other, said planetary gears meshing with said trains of transmission mechanisms, a driven element, means for connecting and disconnecting said transmission mechanism with said driven element, and a clutch device operable effectively to lock one of said trains against rotation and as an incident thereto coupling the other of said trains with the driven element.

7. In a gearing, duplicate trains of transmission mechanisms, a planetary gear support, pairs of planetary gears carried by said support and having the gears of each pair rigid with each other, said planetary gears meshing with said trains of transmission mechanisms, a driven element, means for connecting and disconnecting said transmission mechanisms with said driven element, a clutch device operable effectively to lock one of said trains against rotation and as an incident thereto coupling the other of said trains with the driven element, and automatic means for operating said clutch device.

8. In a gearing, duplicate trains of transmission mechanisms, a planetary gear support, pairs of planetary gears carried by said support and having the gears of each pair rigid with each other, said planetary gears meshing with said trains of transmission mechanisms, a driven element, means for connecting and disconnecting said transmission mechanisms with said driven element, a clutch device operable effectively to lock one of said trains against rotation and as an incident thereto coupling the other of said trains with the driven element, and automatic means under control of the driven element operable effectively to shift the clutch after a predetermined number of rotations of said driven element.

9. A gearing, comprising a revoluble planetary gear support, a plurality of pairs of planetary gears arranged in the support and having the gears of each pair rigid with each other, duplicate power transmission mechanisms geared to alternate ones of the planetary gears, and a shiftable clutch for locking one of said transmission mechanisms against rotation causing the other to revolve in one direction, and locking the other against rotation causing the opposite one to rotate in a counter-direction.

10. A gearing, comprising a revoluble planetary gear support, a plurality of pairs of planetary gears arranged in the support and having the gears of each pair rigid with each other, duplicate power transmission mechanisms geared to alternate ones of the planetary gears, a shiftable clutch for locking one of said transmission mechanisms against rotation causing the other to revolve in one direction, and locking the other against rotation causing the opposite one to rotate in a counter-direction, and automatic means for effecting the shifting of said shiftable clutch.

11. Gearing, comprising a shaft, a planetary gear support rotatable on said shaft, a sleeve encompassing said shaft, stud shafts journaled for rotation in said support, a plurality of pairs of planetary gears arranged on opposite ends of said stud shafts, gear connections between one of the planetary gears of each pair and said first-named shaft, gear connections between the other one of the planetary gears of each pair and said sleeve, driven mechanisms connected with said first-named shaft and said sleeve, respectively, and a clutch device whereby said sleeve and shaft may be alternately held against rotation effectively to cause reverse rotation of the driven mechanism.

12. Gearing, comprising a shaft, a planetary gear support rotatable on said shaft, a sleeve encompassing said shaft, stud shafts journaled for rotation in said supports, a plurality of pairs of planetary gears, arranged on opposite ends of said stud shafts, gear connections between one of the planetary gears of each pair and said first-named shaft, gear connections between the other one of the planetary gears of each pair and said sleeve, driven mechanisms connected with said first-named shaft and said sleeve, respectively, a clutch device whereby said sleeve and shaft may be alternately held against rotation effectively to cause reverse rotation of the driven mechanism, and automatic means for shifting the clutch device.

MONTGOMERY SCHUYLER.